Figure 10:
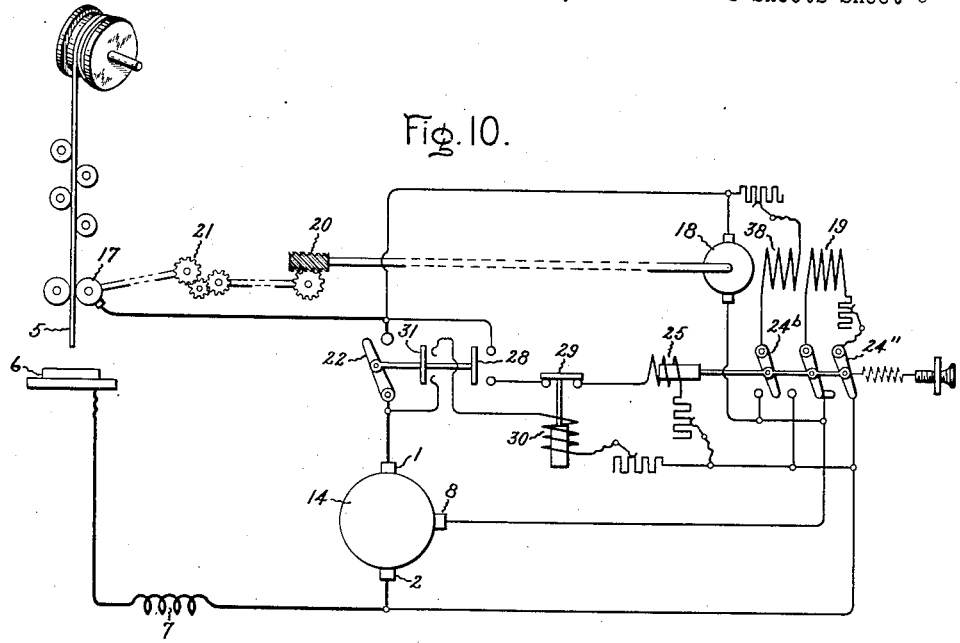

Sept. 16, 1924.
P. O. NOBLE
ARC WELDING
Filed Feb. 16, 1922   6 Sheets-Sheet 1
1,508,712
Fig. 1.
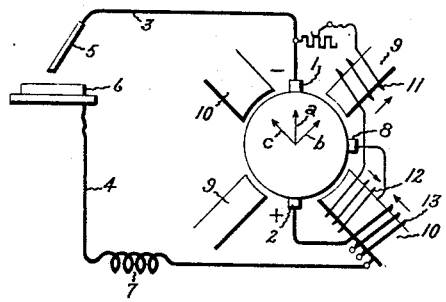
Fig. 2.
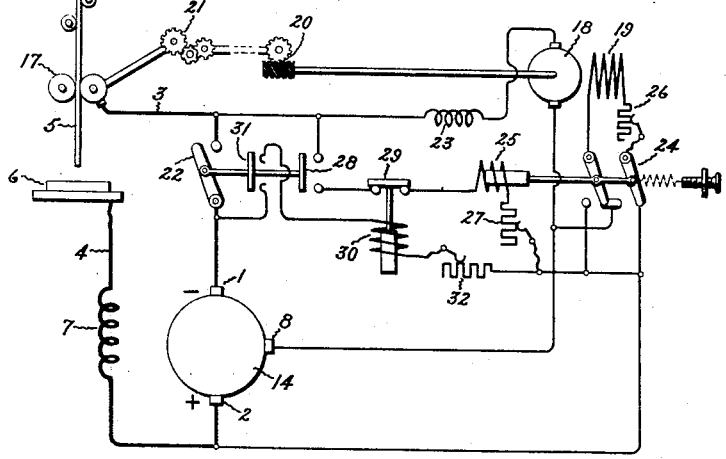
Fig. 3.       Fig. 4.       Fig. 5.
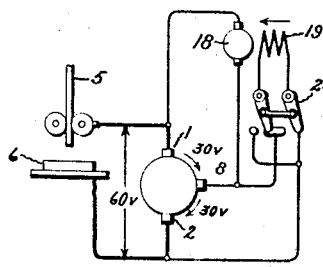 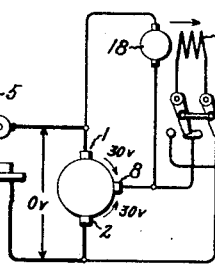 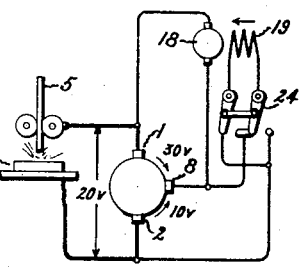
Inventor:
Paul O. Noble,
by Albert G. Davis
His Attorney.

Sept. 16, 1924.  
P. O. NOBLE  
ARC WELDING  
Filed Feb. 16, 1922  
1,508,712
6 Sheets-Sheet 2
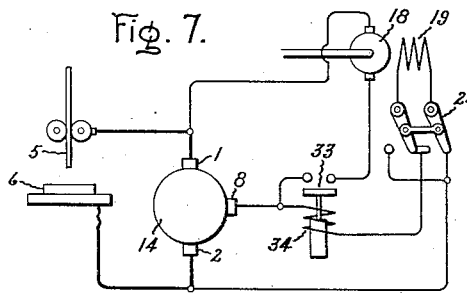
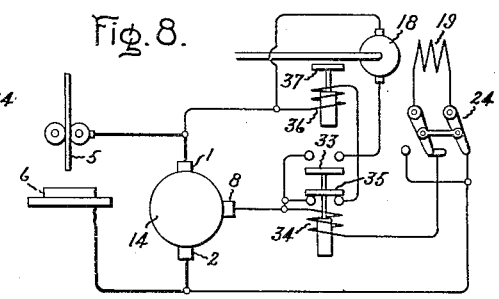
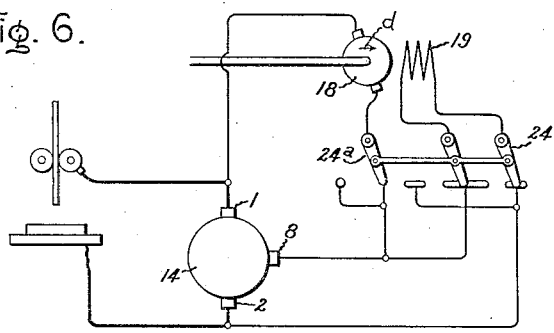
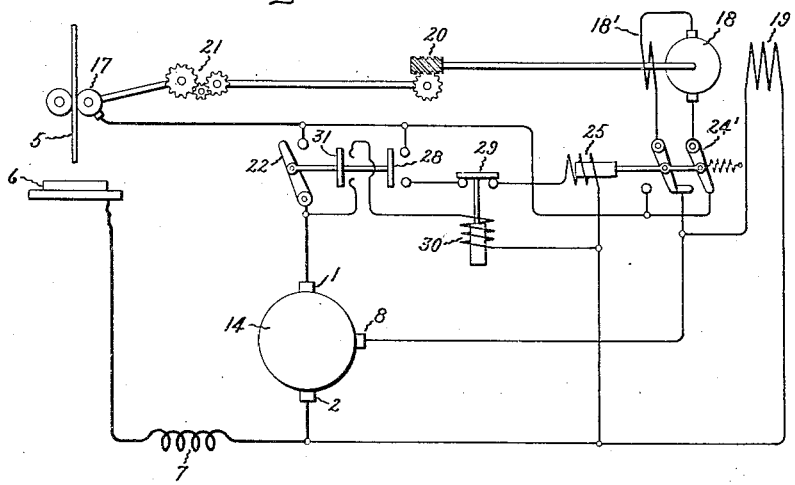
Inventor:  
Paul O. Noble,  
by Albert G. Davis  
His Attorney.

Inventor:
Paul O. Noble
by *[signature]*
His Attorney.

Sept. 16, 1924.

P. O. NOBLE

ARC WELDING

Filed Feb. 16, 1922

1,508,712

6 Sheets-Sheet 4

Inventor:
Paul O. Noble,
by His Attorney.

Sept. 16, 1924.
P. O. NOBLE
ARC WELDING
Filed Feb. 16, 1922

1,508,712

6 Sheets-Sheet 6

Inventor:
Paul O. Noble,
by Albert G. Davis
His Attorney.

Patented Sept. 16, 1924.

1,508,712

UNITED STATES PATENT OFFICE.

PAUL O. NOBLE, OF SCHENECTADY, NEW YORK, ASSIGNOR TO GENERAL ELECTRIC COMPANY, A CORPORATION OF NEW YORK.

ARC WELDING.

Application filed February 16, 1922. Serial No. 537,077.

*To all whom it may concern:*

Be it known that I, PAUL O. NOBLE, a citizen of the United States, residing at Schenectady, county of Schenectady, State of New York, have invented certain new and useful Improvements in Arc Welding, of which the following is a specification.

My invention relates to electric arc welding and more particularly to electric arc welding systems of the automatic or semi-automatic type wherein the welding arc is maintained between a metallic electrode and the work, and wherein means are provided adapted automatically and continuously to feed the electrode and regulate the rate of feed to maintain the arc at substantially constant length.

Automatic machines have therefore been developed for continuously feeding the welding electrode and regulating the rate of feed to maintain the arc automatically. Such a machine is disclosed in my application Serial No. 323,170, filed September 11, 1919, which is a continuation of my application Serial No. 254,710, filed September 19, 1918, and assigned to the assignee of the present application. In these automatic machines the welding wire or electrode is unwound from a reel which may carry several hundred feet of electrode, thereby making it possible to make the longest seam in one operation and without waste of electrode material. In these completely automatic machines the welding head which feeds the electrode is automatically moved relatively to the work so that the arc automatically traverses the joint to be welded. Semi-automatic arc welding machines have also been developed in which automatic means of some character is used to regulate the arc length while the arc is traversed over the work manually, no means being provided to produce relative motion of the work under the arc. In my application, Serial No. 487,875, filed July 27, 1921, assigned to the assignee of the present application, I have disclosed a semi-automatic machine wherein the automatically regulated electrode feeding mechanism feeds the electrode through a flexible tube. This tube may be ten or fifteen feet in length and a light welding tool through which the electrode is delivered is mounted on its free end. The operator manually traverses the arc over the joint to be welded, the flexible tube permitting free movement of the tool for this purpose. No skill is required on the part of the operator to maintain the arc length constant since this is done by the automatic mechanism for regulating the rate of electrode feed. In the automatic and semi-automatic machines disclosed in my copending applications to which I have referred, I operate the electrode feeding mechanism by a motor whose armature is connected in shunt to the arc. The voltage across the arc is a correct measure of the arc length and variations in arc voltage are utilized to produce corresponding variations in the rate of electrode feed. In order to make the operation sufficiently sensitive and certain I usually provide a sensitive voltage responsive regulator such for example as a vibratory regulator and arrange such regulator to control the field strength of the electrode feed motor and thereby assist in the regulation of the motor speed.

It has also been proposed to regulate the speed of the electrode feed motor in accordance with variations in the current supplied to the arc. This method of regulation requires that the voltage applied to the welding circuit be changed with changes in the welding current, since the voltage of the arc itself depends only on its length and is independent of the current therethrough. More current causes the area of the arc stream to increase and the resistance therefore decreases, while the voltage drop remains constant. Doubling the current reduces the resistance to one-half so that the product of current and resistance is unchanged. It is this property which renders an arc unstable. In order to maintain an arc from a constant voltage source a series of stabilizing resistance must be used. This stabilizing resistance on an increased current consumes increased energy and produces a voltage drop in the circuit which supplies the arc and thereby cuts down the welding current. With such a series resistance, current regulation becomes possible since a variation in length of the arc then varies the welding current. If, for example, the arc lengthens, its voltage varies proportionately even should the current not vary. The difference between the arc voltage and the voltage of the source is thus varied and this changed voltage difference changes the current through the series resistance. These effects take place simultaneously, that is to say, the current through the resistance varies inversely with the arc length so that the voltage drop in the series resistance always equals the difference between the source voltage and the arc voltage. A series resistance is, however, wasteful of energy and it is more efficient to use a source of energy whose voltage falls off with an increase in current thereby securing the same effect, as far as the arc is concerned as is secured by the series resistance and a constant potential source.

The utilization of the arc current for regulation of the rate of electrode feed as heretofore proposed presents the difficulty that this current does not vary sensitively with the permissible changes in arc voltage. In systems utilizing a series resistance for stabilizing purposes the voltage falls regularly as the current increases but the relative rates of the voltage and current variation are different. If for example the open circuit voltage is 100 volts and it is desired to use 20 volts at the arc then an increase of 10% in arc voltage will reduce the current only about 2.5%. This is also true, of course, where a generator is used having a straight line voltage characteristic such as is given by a series resistance. If the open circuit voltage is reduced to 60 volts, the operation is improved since a 10% variation in arc voltage will produce approximately a 5% variation in current but the sensitiveness of regulation is still seen to be but half as great as might be secured by a regulating means responsive to arc voltage.

An object of my invention is to provide an arrangement for regulating the rate of electrode feed which will produce a regulating effect varying much more sensitively than the arc voltage and far more sensitively than the current in the arc or any known electrical characteristic of the arc which is available for regulating purposes.

A further object of my invention is to provide an arrangement of the class described which will utilize variations produced in the source of current which supplies the welding circuit for regulating the speed of the electrode feeding mechanism to maintain the arc voltage constant with a high degree of accuracy, thereby obviating the necessity of regulating devices connected either in shunt to or in series with the arc for controlling the electrode feeding mechanism.

A further object is to provide a regulating arrangement for controlling the speed of the electrode feed motor which will involve the use of no moving contacts or other moving parts to accomplish the necessary changes in the speed of the feed motor while the welding arc is in operation.

A further object of my invention is to provide an arrangement which will utilize variations produced in the source of current for not only regulating the rate of electrode feed during welding, but also for automatically striking the arc initially and for restriking the arc quickly and with certainty should it happen to be broken or short circuited while welding.

My invention will be better understood from the following description taken in connection with the accompanying drawings and its scope will be pointed out in the appended claims.

Figure 11:
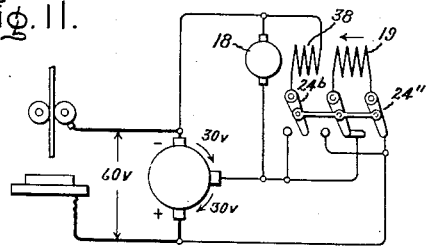
Figure 12:
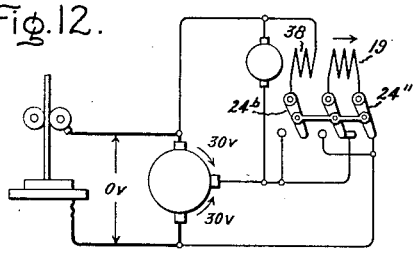
Figure 13:
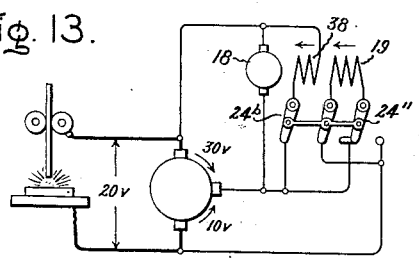
Figure 14:
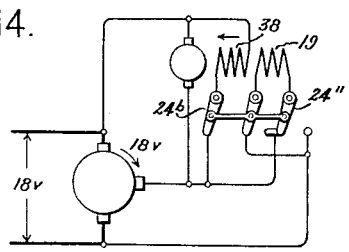
Figure 15:
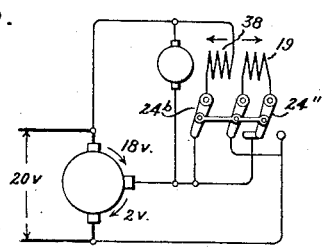
Figure 16:
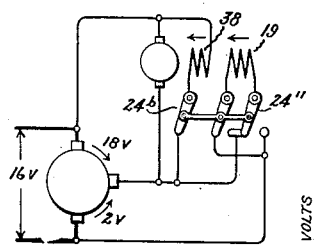
Figure 17:
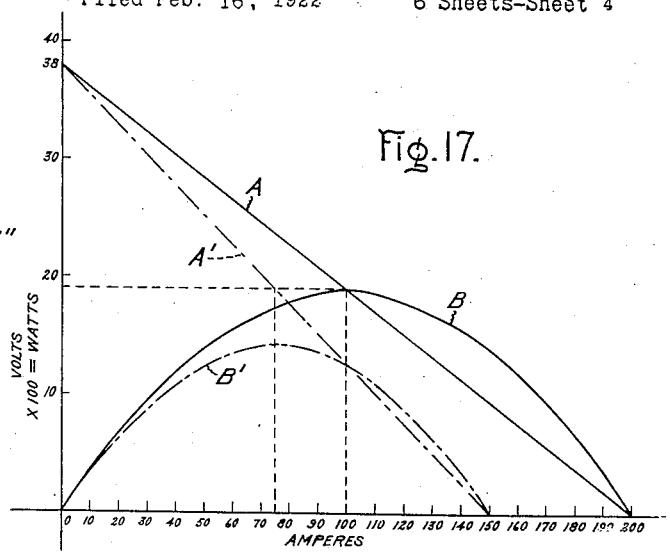
Figure 18:
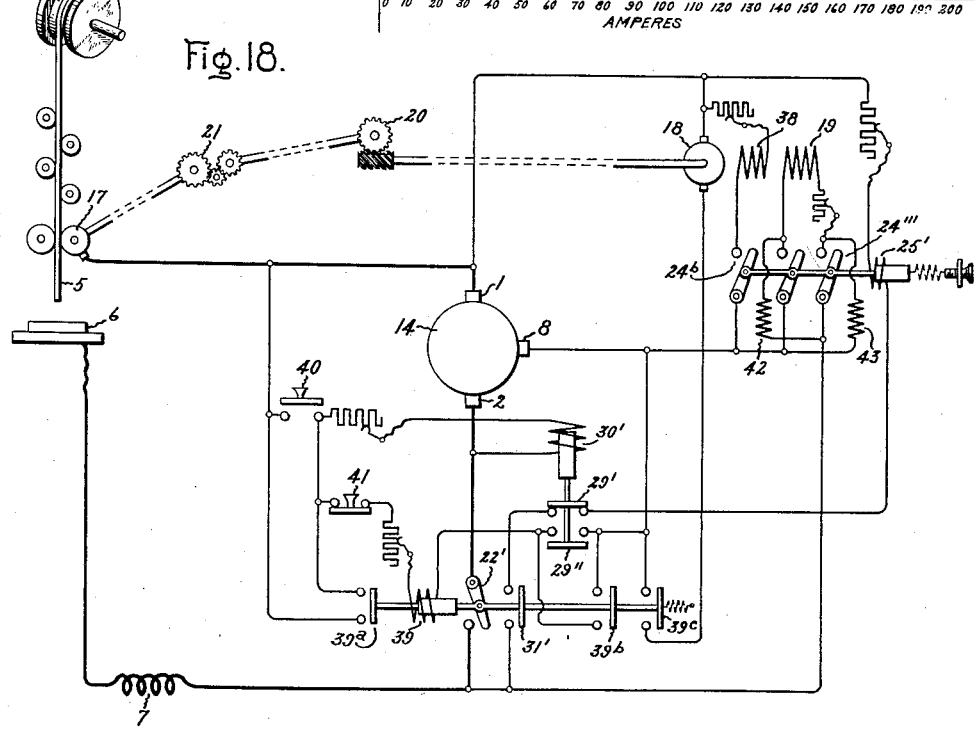
Figure 19:
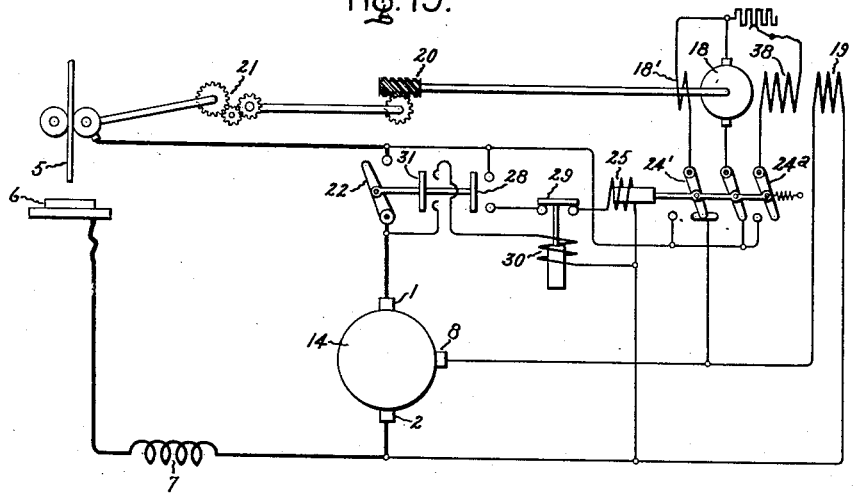
Figure 20:
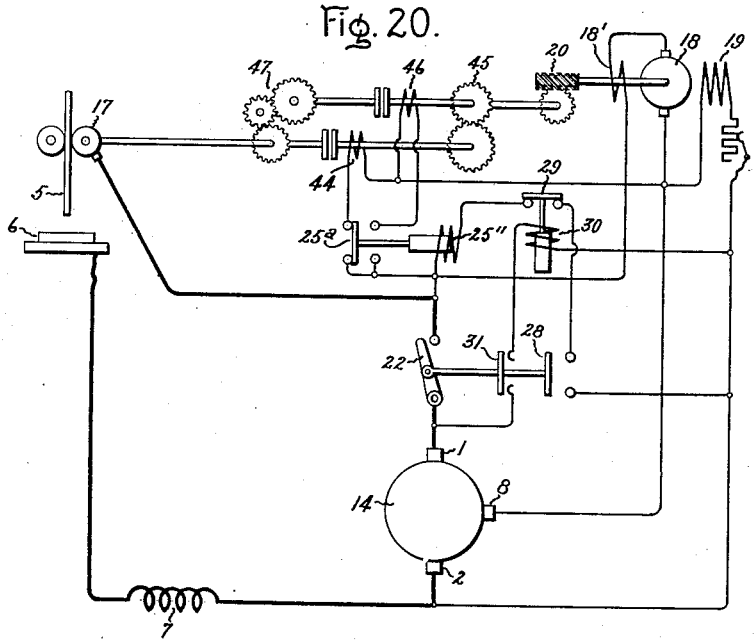
Figure 21:
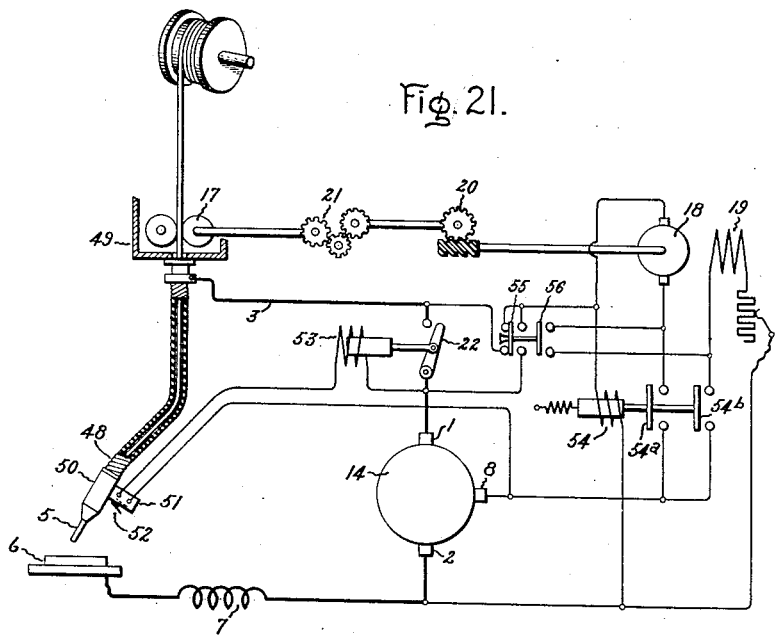

In the accompanying drawings, Fig. 1 diagrammatically represents a type of generator adapted to be used to practice my invention; Fig. 2 diagrammatically represents an automatic arc welding system embodying my invention; Figs. 3, 4 and 5 diagrammatically represent different phases of the operation of the system shown in Fig. 2; Fig. 6 represents the effect of employing an electrode feed motor with the brushes shifted in a particular direction in the embodiment of my invention shown in Fig. 2; Figs. 7 and 8 illustrate modifications of the system shown in Fig. 2; Fig. 9 illustrates a modification of the embodiment of my invention shown in Fig. 2 wherein means are provided for reversing the connections of the armature of the electrode feed motor instead of reversing the motor field connections; Fig. 10 illustrates a modification of the embodiment of my invention shown in Fig. 2 in which two field windings are provided on the electrode feed motor; Figs. 11, 12 and 13 diagrammatically illustrate the action of the modification shown in Fig. 10 during different phases of the operation; Figs. 14, 15 and 16 illustrate the action of the system shown in 10 when the generator is designed for an open circuit voltage which is twice the desired normal arc voltage during welding; Fig. 17 is a curve sheet illustrating the relationship between voltage and current and power in the arc in a system in which the generator open circuit voltage is twice normal arc voltage; Fig. 18 is a modification of the embodiment of my invention shown in Fig. 10; Fig. 19 represents a further modification of my invention wherein a plurality of field windings are provided on the electrode feed motor and wherein means are provided for reversing the armature circuit of said motor; Fig. 20 represents a further modification of my invention in which no means are utilized for reversing any connections to the electrode feed motor but wherein means are provided for mechanically reversing the direction of feed of the electrode at a certain phase of operation of the system; and Fig. 21 diagrammatically illustrates my invention applied to a semi-automatic arc welding machine wherein the arc is struck manually.

Since the operation of my invention depends upon the use of a source of current for supplying the welding circuit wherein a plurality of electromotive forces are produced, and vary sensitively with the arc length during welding, it will facilitate the description of my invention first to describe the construction and operation of one type of generator which may be used. Fig. 1 diagrammatically illustrates a self-excited generator adapted to produce such voltages without the use of external regulating devices, although in its broadest aspect my invention is not limited to any particular type of source for the welding current as long as it will produce electromotive forces of the desired character. The type of generator illustrated is disclosed and claimed in the patent to Bergman, No. 1,340,004, May 11, 1920. The generator is provided with main brushes 1 and 2 which are adapted to deliver arc voltage to the welding circuit mains 3, 4, to which the fusible metallic electrode 5 and the work 6 are respectively connected. In the drawing the customary reactance 7 is shown in the welding circuit. This reactance tends to prevent sudden changes in the welding current and enables the arc to be more readily held. No resistance or other regulating means is connected between the main brushes of the generator and the welding electrodes since the generator inherently provides all necessary regulation. The generator is provided with an auxiliary brush 8 and is so constructed that the electromotive force between brushes 1 and 8 is substantially constant while the electromotive force between brushes 2 and 8 reverses and varies so that the electromotive force between main brushes 1 and 2 is always the algebraic sum of the electromotive forces between brushes 1 and 8 and brushes 2 and 8. To accomplish this result the generator is provided with two sets of field poles 9 and 10. The set of poles 9 produces the electromotive force between brushes 1 and 8 and this set of field poles is arranged to be substantially saturated so that the electromotive force produced between these brushes is substantially constant. The set of field poles 10 is arranged to produce the electromotive force between brushes 2 and 8 and this set of field poles is operated below saturation so that the flux therein is variable. A shunt winding 11 is arranged to magnetize the set of poles 9 and a shunt winding 12 is arranged to magnetize the set of poles 10. These windings 11 and 12 are excited at constant voltage from the brushes 1 and 8. A winding 13 is also provided on the set of poles 10, which winding is in series with the welding circuit and provided with taps so that its effect may be adjusted. The shunt windings 11 and 12 are connected to produce magnetomotive forces at all times in the direction of the arrows placed alongside these windings. The armature reaction of the generator is represented by the arrow $a$. The component of this armature reaction in line with the poles 9 is represented by the arrow $b$ and is arranged to be in the same direction as the mangetomotive force of the shunt winding 11. The component of the armature reaction in line with the poles 10 is represented by the arrow $c$ and this component is arranged to be in the opposite direction to the magnetomotive force of the constantly energized winding 12. The winding 13 is connected so that the magnetomotive force produced thereby is in the same direction as the component $c$ of the armature reaction. This is represented by the arrow alongside the winding 13. The armature reaction and the strength of the winding 13 vary with the current in the welding circuit. When the welding circuit is open the electromotive force between brushes 2 and 8 is in the same direction as, and equal to, the electromotive force between brushes 1 and 8 so that the voltage at the brushes 1 and 2 is equal to the sum of these electro-motive forces. If the machine is designed so that the voltage between brushes 1 and 8 is 30 volts the voltage at the brushes 1 and 2, when there is no current in the welding circuit, that is, when the welding circuit is open, will be 60 volts. To start the welding arc the electrode 5 is touched to the work 6 and withdrawn. When the welding circuit is thus short circuited by placing the welding electrodes in contact a heavy current flows in the welding circuit. A strong armature reaction is thus produced in the generator and the winding 13 is strongly energized. The flux through poles 9 is not substantially varied, however, even though the component $b$ of the armature reaction increases because these poles are substantially saturated. The action of the component $c$ of the armature reaction, together with the action of winding 13, however, reverses the flux through poles 10 and produces a flux therein substantially equal to the flux that was previously produced by the winding 12 so that the electromotive force between brushes 2 and 8 is now changed from 30 volts in one direction to 30 volts in the opposite direction. The voltage at the main brushes 1 and 2 is therefore reduced practically to zero, since but a very low voltage is required to produce the short circuit current. When the operator withdraws the electrode 5 to establish the welding arc, the electromotive force between the brushes 2 and 8, while remaining opposed to the electromotive force between brushes 1 and 8, is reduced in value. If the arc drawn is of such length that the arc voltage is 20 volts the electromotive force between brushes 2 and 8 will be 10 volts; that is, the arc voltage is the difference between the positive voltage of 30 volts and the negative voltage of 10 volts. If the arc voltage is increased 10%, that is, from 20 volts to 22 volts, the voltage between brushes 2 and 8 will decrease from 10 volts to 8 volts or 20%. Similarly if the arc voltage is decreased 10%, that is, from 20 volts to 18 volts, the voltage between brushes 2 and 8 will increase from 10 volts to 12 volts which is again 20%. It is thus seen that the percentage of voltage variation between brushes 2 and 8 is twice as great as the percentage voltage variation at the arc. According to my invention I utilize this sensitively varying electromotive force for controlling the rate at which the electrode 5 is fed toward the work so that the arc length is maintained constant with twice the degree of sensitiveness that may be obtained by regulating means responding directly to changes in the arc voltage. The sensitiveness of regulation is far in excess of anything that can be secured by means responsive directly to variations in the welding current. The machine gives substantially a straight line voltage characteristic from open circuit to short circuit; that is, the voltage falls regularly as the current increases in the welding circuit. This straight line proportionality between voltage and current is also characteristic of all so-called constant potential series resistance systems, that is, systems in which the welding circuit is supplied from a constant voltage source and a series resistance used to stabilize the arc and limit the current on short circuit. In any system having this straight line voltage characteristic the sensitiveness of the current variation with changes in the arc length is determined solely by the open circuit voltage. If the open circuit voltage is 60 volts as in the example assumed, a 10% variation in arc voltage will produce but 5% variation in the arc current, whereas the percentage variation in the electro-motive force between brushes 2 and 8 is 20%, or four times as great.

Referring now to the embodiment of my invention shown in Fig. 2, the generator is shown at 14. The generator is assumed to be constructed as shown in Fig. 1, being provided with the brushes 1, 2 and 8 exactly as in Fig. 1. The brushes 1 and 2 are arranged to supply current directly to the welding-mains 3, 4 which are connected respectively to the electrode 5 and work 6 as in Fig. 1. In this case the electrode 5 is represented as being drawn from a reel 15 through straightening rolls 16 by means of electrode feed rolls 17 which are arranged to be driven by an electrode feed motor provided with an armature 18 and field winding 19. As is customary the motor is connected to the electrode feed rolls 17 through speed reducing gearing since for successful operation the motor must operate at comparatively high speed while the feed rolls 17 turn approximately three or four revolutions per minute. This speed reducing gearing is represented at 20 and 21, the gearing 21 preferably being arranged so that change-speed gears may be used since the speed at which the electrode is fed must be greater for a small electrode, such for example as $\frac{1}{16}''$ electrode than for electrodes of $\frac{1}{8}''$ and larger. By adjusting this gearing the motor speed does not need to be changed so greatly for different electrodes and welding currents. Armature 18 of the electrode feed motor is connected across the constant voltage brushes 1 and 8 while field winding 19 is supplied from the variable voltage brushes 2 and 8. Switch 22 is arranged to complete the welding circuit and also to complete the circuit of the motor armature 18. A reactance 23 may be provided in the circuit of the armature 18 for a purpose hereinafter described. A reversing switch 24 controlled by a solenoid 25 is arranged in the circuit of the field winding 19. An adjustable resistance 26 is provided in the circuit of winding 19 to enable the speed of the electrode feed motor to be adjusted. The solenoid 25 is arranged to be connected across the welding circuit during welding and is arranged to throw over the switch 24 to reverse the connection of the field winding 19 when the arc voltage reaches a predetermined low value, for example ten volts, after the arc has been struck. An adjustable resistance 27 is provided in the circuit of solenoid 25 to enable the solenoid to be adjusted so as to operate at any desired predetermined voltage. Two contacts 28 and 29 are provided in the circuit of solenoid 25 so that the circuit is closed only when the voltage of the welding circuit is below a predetermined value. The contact 28 is interlocked with the switch 22 and the contact 29 is controlled by the solenoid 30 which is connected across the welding circuit when the switch 22 is closed by means of the interlock contact 31 operated with the switch 22. Upon closing the switch 22, the contact 31 closes prior to the closing of contact 28. The solenoid 30 is arranged to hold the contact 29 open whenever the voltage of the welding circuit is above a predetermined value for example, 30 or 40 volts. An adjustable resistance 32 is provided to enable the operating voltage of the solenoid 30 to be adjusted.

The operation of the system shown in Fig. 2 will be described in connection with Figs. 3, 4 and 5. When the welding circuit is open the voltages between the brushes 1, 8 and 2, 8 add so that if these voltages are each 30 volts, the welding circuit voltage is 60 volts, as indicated in Fig. 3, where the electrode 5 is shown separated from the work 6 and the arc broken. The switch 24 is in the position shown in Fig. 3 since, when the switch 22 is closed to close the welding circuit, it first closes contact 31 so that the high voltage on the welding circuit opens contact 29 before contact 28 is closed. Solenoid 25 therefore remains deenergized during this phase of operation. The constant voltage brushes always supply current to the armature 18 in the same direction. During the phase of operation shown in Fig. 3, the field winding 19 is strongly energized in the direction of the arrow shown alongside this winding. The feed motor, therefore, starts into operation and feeds the electrode 5 down into contact with the work as shown in Fig. 4. As soon as the welding circuit is thus short-circuited the voltage between brushes 2 and 8 reverses to full value in the opposite direction. Field winding 19 is, therefore, reversed as shown by the arrow in Fig. 4 to reverse the direction of operation of the feed motor to withdraw the electrode 5 from the work and strike the welding arc. At the time the electrode touches the work the solenoid 30 is deenergized so that the contact 29 closes. The switch 24, however, remains in the same position since the voltage is now insufficient to energize the solenoid 25. As soon as the operation of the motor has drawn the welding arc as shown in Fig. 5, it is necessary again to reverse the operation of the feed motor since the electrode must now be fed toward the work at the proper rate to compensate for its consumption by the welding current. This reversal is accomplished by reversing the connections to the field winding 19 and this is done by the solenoid 25 which throws over the reversing switch whenever the arc length corresponds to the setting of the solenoid 25, which setting has been assumed to be 10 volts. The field winding 19 as shown by the arrow in Fig. 5 is now energized in the same direction that it was energized under the phase of operation shown in Fig. 3, that is, in a direction to cause the motor to operate to feed the electrode toward the work. The rate at which the electrode is now fed is very sensitively regulated to maintain the arc length substantially constant for the reason that variations in the arc length are accompanied by greater variations in the voltage between the brushes 2 and 8 which supply the field winding 19. If, for example, the arc voltage tends to increase the field winding 19 is weakened thus causing the armature 18 to speed up and restore the arc to its normal length. A decrease in the arc length has the opposite effect, namely, to decrease the rate of electrode feed. The speed of the feed motor may be adjusted at any time desired by merely changing the resistance 26 in circuit with the winding 19.

Where the brushes of the electrode feed motor are normally set backward with reference to the normal direction of rotation there is a magnetizing effect produced by the armature of this motor as shown by the arrow $d$ in Fig. 6. It will be observed that the direction of this magnetization is in the same direction as the magnetization produced by winding 19 during the phase of operation during which the motor is operated to withdraw the electrode from the work. This magnetization provides a weak field for the electrode feed motor which tends to continue operation at a high speed while switch 24 is being reversed. If the arc length should approach 30 volts the voltage between brushes 2 and 8 would fall to zero so that the rotation of the electrode feed motor would not be reversed even if the connections of the field winding 19 were reversed by the switch 24, since the field winding 19 would be deenergized and the motor would continue to rotate by reason of field magnetization produced by the armature reaction $d$. To prevent this undesirable operation an additional contact 24$^a$ may be provided on the switch 24 as shown in Fig. 6 so that the circuit of the armature 18 is opened while the switch 24 is passing from one extreme position to the other. The armature reaction field $d$ is thus eliminated while the circuit is open at contact 24$^a$.

Instead of providing an auxiliary contact on the switch 24, an auxiliary relay may be provided for controlling the circuit of the armature of the electrode feed motor by the current through the field winding 19. This arrangement is shown in Fig. 7 wherein a contact 33 is provided in the armature circuit controlled by a winding 34 in series with the field winding 19. It will be apparent that winding 34 is momentarily deenergized while the switch 24 is being reversed. The contact 33 will therefore open as switch 24 goes over and close again when the switch completes the circuit of the field winding in the reverse direction.

If desired, a brake may be provided to bring the feed motor armature quickly to rest while the switch 24 is being reversed. An arrangement embodying this feature is shown in Fig. 8, which corresponds to the arrangement shown in Fig. 7, but includes the additional feature of a contact 35 controlled by the winding 34 which completes the circuit of a winding 36 to apply the brake 37 to the shaft of the motor 18 during the time the winding 34 is deenergized. It will be apparent that my invention is not limited to the provision of any particular arrangement for braking the feed motor and that the arrangement shown is merely one form which the idea may take It will be apparent that the arrangement shown in Figs 6, 7 and 8 presents the advantage over the arrangement shown in Fig. 2, that the armature 18 of the electrode feed motor is protected from the rather large current which tends to flow when the field winding 19 is deenergized. At this phase of the operation, the motor has no counter-electromotive force and there is nothing to limit the current through the armature 18 supplied from the constant voltage brushes 1 and 8 except the resistance of the circuit. I have experienced no difficulty from this cause, however, but where the arrangement shown in Fig. 2 is used it would be of some advantage to provide a small reactance 23 in the circuit of the armature 18 as shown in Fig. 2 which will tend to prevent the current through the feed motor armature increasing while the winding 19 is deenergized.

It will be apparent that my arrangement for controlling the operation of the electrode feed motor does away entirely with the connection of any low resistance or low reactance devices in parallel with the welding circuit. This is of considerable advantage over such an arrangement as is described in my application, Serial No. 323,170, heretofore referred to, wherein the armature of the electrode feed motor is in parallel with the welding circuit. Where the armature of the electrode feed motor is in shunt with the arc it must be designed to vary sensitively with changes in arc voltage and its resistance must therefore be very low. This means that a fairly low resistance and low reactance path is always in shunt to the arc, which tends to make the arc more unstable since the full voltage of the reactance coil 7 in series with the arc is not so effective to prevent changes in the arc current. There is a further disadvantage inherent in any system where the armature of the electrode feed motor is connected in shunt to the arc and this arises by reason of the contact resistance between the brushes and commutator of the motor. A motor in shunt to the arc must operate at arc voltage which in an automatic system will vary from 12 to 20 volts according to the size of electrode used. The brush contact resistance of a motor is substantially the same whether the motor is designed to operate at 12 volts or 40 volts and this resistance is a very considerable part of the entire resistance of the armature circuit. Not only do variations in this resistance tend to affect the speed of the motor but any resistance, even though constant is very objectionable since the load on an electrode feed motor is quite variable, due to slight variations in the diameter of the electrode and slight bends or kinks throughout its length. Any motor which has an appreciable resistance in series tends to vary in speed considerably with variations in load since more load means more current and therefore more voltage drop in the resistance and less voltage available for operating the motor. With my control arrangement the voltage applied to the electrode feed motor is constant and there is no requirement that the motor be designed to operate at a low arc voltage. Therefore contact resistance at the brushes becomes of no importance.

It will be observed that no automatic regulator is provided to control the operation of the feed motor since the regulation is secured by using voltage variations which are already available in the generating source. The control and regulating system therefore becomes very simple since no devices are employed which are apt to get out of order and require expert attention.

While I have shown the armature of my electrode feed motor supplied from the constant voltage brushes 1 and 8, it will be obvious to those skilled in the art that since this motor always takes current in the same direction and is supplied at constant voltage, it may be connected to any desired source of supply. I connect it to the brushes 1 and 8 as a convenient source of supply of constant voltage but the entire regulation and control in my system is produced by the varying voltage at the brushes 2 and 8.

Instead of reversing the field winding 19 to restore the forward direction of feed when the arc has been struck, I may reverse the armature circuit of the electrode feed motor, leaving the field winding permanently connected to the regulating brushes of the generator. This arrangement is shown in Fig. 9 which differs from the arrangement shown in Fig. 2 only in using a reversing switch 24' in the circuit of the armature 18 instead of providing such switch in the circuit of winding 19, and in providing a few series turns on the field of the electrode feed motor.

The operation of the arrangement shown in Fig. 9 is believed to be obvious after the detailed description of the operation set forth in connection with that of Fig. 2. Briefly stated, the field winding 19 and armature 18 are first energized in a direction to feed the electrode into contact with the work. When such contact is made winding 19 reverses and the feed motor consequently reverses to withdraw the electrode and strike the arc. As soon as a predetermined arc length is reached the switch 24' is operated again to reverse the direction of the electrode feed motor and establish the normal forward feed, the rate of which is sensitively controlled by the variations in the strength of field winding 19. The series field winding 18' on the motor is arranged to act in the same direction as the winding 19 during the time that the motor is operating to feed the electrode toward the work. While the motor is operating to withdraw the electrode from the work the winding 18' acts differentially with respect to the winding 19 but when the switch 24' is operated, winding 18' is reversed and the windings 18' and 19 therefore act in the same direction during the normal operation of the motor while welding. Winding 18' has little effect on the speed of the motor during the normal operation for the reason that the current through the motor is small when the motor is running. This winding, however, is very effective in preventing the motor from over-running when it is operating in a direction to withdraw the electrode and strike the arc. If for some reason the switch 24' failed to operate as soon as it should, the regulating winding 19 would become very weak as heretofore set forth. If the switch 24' were operated when winding 19 was practically deenergized there would be no torque to stop the motor and reverse it. With the winding 18' present, however, there will always be a strong torque available to reverse the motor as soon as the switch 24' operates, whenever this operation may take place. The counter-electromotive force of the motor is small when reversal takes place and therefore a large current tends to flow through the motor armature from the constant voltage brushes 1 and 8 of the generator. This large current produces a strong field in the series field winding 18', in the direction necessary to stop the motor and quickly reverses it. The series magnetization might be obtained by shifting the brushes on the commutator of the electrode feed motor forwardly with respect to the normal direction of the motor operation, thus securing the series magnetization by armature reaction instead of through a series field winding, but the series field winding is preferable for the reason that there is more tendency to sparking at the motor brushes when they are shifted forwardly.

Fig. 10 represents a further embodiment of my invention wherein the electrode feed motor is provided with two field windings, a field winding 19 which corresponds to the field winding 19 shown in the modifications heretofore described, and a field winding 38 adapted, when energized, to be constantly energized. In this arrangement the reversing switch 24" corresponds exactly to the reversing switch 24 of Fig. 2 but this switch is provided with an additional contact 24ᵇ for controlling the circuit of field winding 38. Field winding 38 remains deenergized until the arc is struck after which it is supplied at constant voltage from the brushes 1 and 8. Field winding 19 goes through the same series of changes as the field winding 19 of Fig. 2.

The operation of the modification shown in Fig. 10 will be described in connection with Figs. 11, 12 and 13 which show the action of the field windings during the different phases of operation. Assuming first that the open circuit voltage of the generator is 60 volts, the condition on open circuit is represented in Fig. 11. The field winding 19 is strongly energized and the field winding 38 deenergized. The motor operates to feed the electrode into contact with the work. When such contact is made, field winding 19 reverses, as shown in Fig. 12, to reverse the operation of the feed motor to strike the arc. Field winding 38 still remains deenergized. When the arc voltage has reached a predetermined value the switch 24" is operated to reverse the current through regulating winding 19 and the contact 24ᵇ of the switch is closed to energize the winding 38, which is arranged to produce a magnetomotive force in the same direction as the winding 19 during this phase of the operation. Any variation in the arc voltage now varies the effect of winding 19 and thus varies the excitation of the electrode feed motor to regulate its speed to maintain the arc length substantially constant. The sensitiveness of this arrangement with a 60 volt circuit is not as great as the sensitiveness of the arrangement heretofore described employing a single field winding on the motor. The sensitiveness of the arrangement is, however, still somewhat greater than the sensitiveness of arrangements in which the electrode feed motor is connected in shunt to the arc for regulating purposes. The winding 19 may, for example, be designed to provide 200% normal excitation while the electrode is being fed toward the work to strike the arc and while the electrode is in contact with the work. During this phase of operation 30 volts are applied to this winding. When the arc voltage reaches 20 volts, 10 volts are applied to this winding which will produce one-third of 200% or 67% of normal excitation, leaving 33% of the total excitation to be furnished by the constantly energized winding 38. A two-volt variation in the excitation of the regulating winding will produce a 20% change in the magnetomotive force of this winding or 20% of 67% or 13.4% of the tatal normal flux, that is to say, a 10% variation in arc voltage is accompanied by approximately a 13% variation in the excitation of the electrode feed motor.

The arrangement shown in Fig. 10 is particularly suitable when the open circuit voltage of the generator is made twice the normal arc voltage. This is the condition for constant power in the arc over the welding range. In Fig. 17 line A represents the voltage of the generator which is also the voltage of the arc and curve B represents the power at the arc. The abscissæ represent welding current in amperes and the ordinates represent directly the voltage at the arc. The ordinates multiplied by one hundred represent the power of the arc in watts. The field of the electrode feed motor will be adjusted so as to hold an arc voltage of 19 volts where the open circuit voltage of the generator is made 38 volts as shown in Fig. 17. The current corresponding to this voltage is 100 amperes. The current corresponding to any other voltage may be at once read from the curve. The power of the arc is always represented by the product of the voltage and current for any given arc voltage. It will be observed that with 19 volts at the arc the operation will be at the maximum point of the power curve B which is the point corresponding to the nearest possible approximation to constant power in the arc. Any increase or decrease of the arc voltage decreases the power in the arc slightly but inasmuch as the power curve is substantially horizontal at its maximum point the power in the arc may be said to remain constant. With a straight line voltage characteristic as represented by the line A the short circuit current will be twice the normal welding current where the open circuit voltage is made twice the open arc voltage. Inasmuch as welding will not be done below, say 8 volts at the arc, it is not essential that the curve A be straight throughout its length as long as it is substantially straight throughout the range of welding voltages. In order to avoid unnecessarily large short circuit currents the generator may therefore be designed so that the voltage will fall off more rapidly, than according to the straight line characteristic, for heavy currents corresponding to voltages somewhat below the normal welding range. To change the welding current in a generator of the type shown in Fig. 1 it is merely necessary to vary the number of turns in the differential series field winding 13. If the number of turns in this winding are reduced the short circuit current and therefore the normal welding current are both increased although as just indicated the short circuit current may be limited in any desired manner. Curves A' and B' in Fig. 17 indicate the voltage and power in the arc for a short circuit current of 150 amperes. When the series turns on the machine are adjusted to change the welding current, the rate at which the electrode is consumed will also be changed since the rate at which the electrode wears away due to the vaporizing and fusing action of the current is dependent solely upon the current through the arc and is independent of the voltage across the arc through the normal range of welding voltages used in practice. Since the electrode is consumed at a different rate with a different current, the resistance, shown for example, at 26 in Fig. 2, in circuit with the regulating winding 19 of the motor must be adjusted to correspond to the new electrode feed rate.

If the adjustment required is considerable it will be preferable to change the gears 21. If it be desired to change the normal arc voltage this may be done by changing the open circuit voltage of the generator. If for example it were desired to use 20 volts at the arc instead of 19 while still maintaining the operation at the maximum point of the power curve, the open circuit voltage of the generator would be made 40 volts, that is, twice the arc voltage. This adjustment may be made in many ways well known to those skilled in the art of dynamo-electric machinery. For example, where the generator is driven by an adjustable speed motor the open circuit voltage may be adjusted merely by changing the speed of the generator. The use of a 40 volt generator instead of a 60 volt generator has advantages from the standpoint of generator design for the reason that magnetic material may be saved in the field structure of the machine since the amount of iron used is dependent upon the amount of flux required which is in turn proportional to the voltage.

The description of the operation of the modification shown in Fig. 10 when arranged for an open circuit voltage of twice the arc voltage, will be set forth in connection with Figs. 14, 15 and 16. These figures represent in each case a welding condition, the action of the field windings during the operation of striking the arc is not being shown, since this action takes place in the same manner as shown in Figs. 11, 12 and 13. In Fig. 14 the arc voltage is assumed to be 18 volts. The total excitation for the electrode feed motor at this time is supplied by the winding 38 since the voltage between the regulating brushes of the generator is zero, so that the field winding 19 is without current. Now, if it be assumed that the arc voltage increases from 18 to 20 volts the voltage at the regulating brushes will rise to 2 volts in a direction to energize the field winding 19 so as to oppose the winding 38 and weaken the field of the feed motor to increase the rate of electrode feed so as to restore the arc voltage. This condition of affairs is represented in Fig. 15. If the arc voltage should decrease to 16 volts the voltage at the regulating brushes would be 2 volts in the opposite direction to that shown in Fig. 15, so as to energize the winding 19 in a direction to assist the winding 38 and increase the excitation of the electrode feed motor to reduce the rate of electrode feed. This condition of affairs is shown in Fig. 16. The polarity as well as the strength of winding 19 is thus varied with changes in arc length. This arrangement now becomes of exactly the same sensitiveness as the arrangement employing a single field winding shown in Figs. 2 and 9. This may be seen from the following example:—a 40 volt open circuit voltage and a 20 volt arc will be assumed instead of a 38 volt open circuit and a 19 volt arc for the purpose of facilitating calculation. On open circuit 20 volts are available for excitation of the winding 19, which we will assume produces 200% normal excitation in this winding. It is to be remembered that at this time the circuit of the winding 38 is open. The same percentage of so-called normal excitation is available when the electrode is in contact with the work but in the reverse direction. When the arc has been established and the field winding 38 is connected in circuit with 20 volts at the arc, the winding 19 will be without current while winding 38 will be designed to produce 100% or normal excitation. A two volt variation in either direction of the exciting winding 19 will produce a magnetomotive force in this winding equal to 20% of normal excitation. That is, the total excitation of the field winding of the electrode feed motor will vary 20% with a 10% variation in arc voltage.

Fig. 18 shows a modification of the embodiment of my invention shown in Fig. 10 in which the winding 19 may be reversed without using a reversing switch or opening the circuit of this winding. Fig. 18 also shows push buttons for controlling the switch in the welding circuit which push button arrangement may, if desired, be employed with any of the modifications heretofore described. In this figure the switch 22' corresponds to the switch 22 of Fig. 10, and is provided with an interlock contact 31' corresponding to the interlock contact 31 of Fig. 10. The windings 25' and 30' correspond to the winding 25 and 30 of Fig. 10. The switch 24''' corresponds to the switch 24'' of Fig. 10 but instead of having two positions is merely moved from open to closed position when the solenoid 25' is sufficiently energized. The contact 24ᵇ controls the circuit of winding 38 exactly as in Fig. 10. A winding 39 is provided for operating switch 22'. A normally open push button 40 is provided for setting the system into operation and a normally closed push button 41 is provided for stopping the operation of the system. A pair of resistors 42 and 43 are connected to the switch 24''' in such a way that when the switch is open the circuit of the winding 19 is completed from the brushes 2 and 8 in one direction and completed in the opposite direction, as hereinafter described, when the switch is closed.

To set the system shown in Fig. 18 into operation the operator merely closes push button 40. This connects the winding 30' across the main brushes 1 and 2 of the generator and, since the voltage is high, this winding opens the contact 29' and closes the contact 29''. The closing of contact 29'' completes the circuit of winding 39 through the push buttons 40 and 41 and the contact 29'' across the constant voltage brushes 1 and 8 of the generator. Winding 39 therefore closes the main switch 22' and the interlock contact 31'. The closing of contact 31' does not however complete the circuit of winding 25' for the reason that contact 29' is open at the time contact 31' closes. An interlock contact 39ᵃ closes when the switch 22' closes and short circuits push button 40 so that the operator does not need to hold this push button closed to keep the system in operation. Interlock contacts 39ᵇ and 39ᶜ are also closed when the switch 22' closes. Contact 39ᵇ short circuits contact 29'' which is at this phase of the operation closed. As will appear later contact 29'' opens at a subsequent phase in the operation, but this opening then has no effect because of the fact that contact 39ᵇ is closed. Contact 39ᶜ completes the circuit of the armature 18 of the electrode feed motor so that this motor may start into operation. The field winding 19 of the electrode feed motor is energized through the following circuit: from the brush 2 through the switch 22', the resistor 42, winding 19, resistor 43 to the brush 8. The electrode feed motor therefore starts into operation in a direction to feed the electrode 5 toward the work 6. When the electrode contacts with the work the voltage of the generator falls practically to zero and the winding 30' permits the contact 29' to close and the contact 29'' to open. The opening of contact 29'' has no effect since it is short circuited by contact 39ᵇ. The closing of contact 29' completes the circuit of winding 25' across the welding circuit. This circuit leads from brush 2, through switch 22', contact 31', contact 29', winding 25' to brush 1. The winding 25', however, does not operate to move the switches 24''' and 24ᵇ until the welding arc has been struck since this winding is adjusted to require considerably more than the short circuit voltage of the generator, although something less than normal welding voltage, to cause it to operate. As will be remembered from the description heretofore given of the operation of the generator, the voltage at the brushes 2 and 8 reverses as soon as the electrode contacts with the work. This reverses the current through the field winding 19 and reverses the direction of operation of the electrode feed motor which therefore operates to separate the electrode from the work and strike the arc. When the arc is struck winding 25' closes switches 24''' and 24ᵇ. The closing of switch 24''' reverses the direction of current through winding 19 and connects the resistors 42 and 43 in parallel with the field winding. The circuit leads from the brush 8 through the left-hand side of the switch 24''' and through the winding 19 and resistor 42 in parallel, through the switch 22' to the brush 2. A circuit also leads from the brush 8 through the resistor 43 and the right hand contact of the switch 24''' to the brush 2. It will therefore be seen that resistors 42 and 43 are in parallel with the field winding 19. The direction of operation of the feed motor is therefore again reversed exactly as in the arrangement shown in Fig. 10 and the normal direction of electrode feed established. The winding 19 responds to variations in the voltage at the brushes 2 and 8 sensitively to control the speed of the electrode feed motor exactly as in Fig. 10 and the arrangement is operative whether the generator is adjusted for twice normal arc voltage or for a higher voltage. I may make the resistors 42 and 43 inductive and this will somewhat increase the sensitiveness of operation since rapid changes in voltage at the brushes 2 and 8 will then cause disproportionate changes in the current through field winding 19. If the reactance of the resistors is made higher than the reactance of winding 19 it is obvious that a sudden increase in the voltage will cause the current through the winding 19 to increase more rapidly than it will increase in the resistors which are in parallel with the field winding. A sudden decrease in voltage has the opposite effect. For slow changes in voltage this effect is not appreciable.

To stop the operation of the system shown in Fig. 18, it is merely necessary momentarily to open push button 41 which deenergizes solenoid 39 and causes all control and regulating circuits to be opened.

Fig. 19 illustrates the double field winding arrangement of the electrode feed motor applied to the modification of my invention shown in Fig. 9 wherein the circuit of the armature 18 of the electrode feed motor instead of the winding 19 is reversed. The operation of this modification is believed to be obvious from the various descriptions heretofore given but briefly stated it is as follows: When the switch 22 is closed, field winding 19 is first energized in a direction to cause the motor to feed the electrode toward the work. The field winding 19 reverses when the electrode makes contact with the work and the electrode feed motor therefore reverses to strike the arc. When the arc is struck, winding 25 operates switch 24' to reverse the armature circuit of the feed motor, exactly as in the arrangement shown in Fig. 9, and simultaneously closes the contact 24ª to energize the field winding 38 in a direction to assist the field winding 19 as in the arrangement shown in Fig. 10. Reversing the armature connections of the feed motor causes the motor to reverse and establish the normal direction of feed, the rate of which is then regulated by the windings 19 and 38 exactly as in the arrangement shown in Fig. 10. I have shown a series field winding 18' on the electrode feed motor as in the arrangement shown in Fig. 9 but such field winding is not really needed in this arrangement since wherever the two-field winding arrangement is used the winding 38 always provides normal excitation on the electrode feed motor so that there is no possibility of this motor failing to reverse even though the arc is drawn so long as practically to deenergize the winding 19.

In the modifications heretofore described I have provided means for reversing the connections to either the armature or the field winding of the electrode feed motor to reverse its operation to restore the normal direction of feed after the arc has been struck. It is not essential, however, that such means be provided since I may permit the electrode feed motor to continue operation in the direction which withdraws the electrode from the work and mechanically reverse the power transmission between the electrode feed motor and the electrode feed rolls. Fig. 20 illustrates an embodiment of my invention utilizing this idea of mechanical reversal. In this case the solenoid 25'', which corresponds to the solenoid 25 of the modification previously described, is arranged to control the circuits of magnetic clutches in the transmission between the electrode feed motor and the electrode feed rolls 17. When the solenoid 25'' is deenergized or energized below a predetermined degree, the contact 25ª closes the circuit of the clutch winding 44 which provides a relatively slow speed transmission in one direction through the gearing 45. When energized above this predetermined degree the contact 25ª opens the circuit of clutch winding 44 and closes the circuit of clutch winding 46 to provide a higher speed gear transmission in the opposite direction through the gearing 47. The transmission through gearing 47 is the transmission which is used during the normal direction of electrode feed during welding and this gearing 47 will therefore preferably be arranged to permit of substituting different gear ratios so that the speed of the transmission may be adjusted for different sizes of electrodes.

The operation of the arrangement shown in Fig. 20 is believed obvious from the descriptions of operation heretofore given but briefly stated is as follows: When the switch 22 is closed the motor starts into operation and transmits motion to the feed rolls through the gearing 45 slowly to feed the electrode into contact with the work, clutch 44 being engaged during this phase of the operation. When the electrode touches the work the field winding 19 reverses as heretofore set forth and reverses the operation of the feed motor to withdraw the electrode slowly from the work to strike the arc. At a predetermined voltage the solenoid 25″ deenergizes clutch 44 and energizes clutch 46 and reverses the direction of electrode feed to establish the normal direction of feed toward the work, the motion now being transmitted through the gearing 47 which may be adjusted for any desired gear ratio. The arrangement presents a slight advantage in that the speed of the electrode during the arc striking operation can be adjusted independently of the speed during the normal direction of electrode feed. It is desirable to use a slow speed of operation during the arc striking period since there is less tendency of jamming the electrode against the work and less tendency of withdrawing the electrode so quickly as to prevent the establishment of the arc. The advantage presented over the other modifications in this respect is not very great, however, for the reason that in all of the modifications the voltage across the regulating brushes of the generator is high during the arc striking phase of the operation and the strength of the field winding of the electrode feed motor relatively great so that the motor operates at slow speed. I have shown the electrode feed motor as provided with the series field winding 18′ in the modification shown in Fig. 20 although this winding may be omitted if desired since it is not necessary to reverse the operation of the motor. The provision of such winding is desirable however for the reason that if the solenoid 25″ should for some reason fail to operate before the arc voltage has reached such a value that the voltage across the regulating brushes is so low as to practically deenergize the field winding 19, the field winding 18′, being strongly energized, will assist the winding 19 so as to insure the continued rotation of the motor when the gear mechanism has been reversed.

In all of the modifications heretofore described it has been assumed that some mechanism has been provided for moving the electrode and the work relatively during welding so as to cause the electrode to follow the line of the seam to be welded. It is common in the art to provide automatic mechanism for securing this traversing motion as shown, for example, by the patent to Hall & Metzger, No. 996,406, June 27, 1911. I have therefore not illustrated such mechanism since it is obvious to those conversant with the art that such mechanism is always present in a completely automatic machine.

In Fig. 21 I show the application of my invention to a semi-automatic arc welding system which embodies my means for controlling the rate at which the electrode is fed to the work but omits the feature of automatically striking the arc and does not require any means for any traversing motor for moving the electrode and work relatively during welding. The electrode 5 is represented as being fed through a flexible tube 48, which tube may be from 10 to 20 feet in length. One end of the tube is secured to the frame 49 upon which the electrode feeding mechanism is mounted and the other end of the tube is secured to a welding tool 50 which may be held in the hand of the operator and moved toward and from the work to strike the arc and be manually moved along the line of the joint to be welded. Owing to the flexible character of the tube joints may be welded in places inaccessible to an entirely automatic welding machine and the tool can be used to do horizontal or vertical or over-head welding with as great, if not greater facility, than is incident to hand welding as ordinarily practiced, where a short piece of electrode is gripped in an electrode holder. Welding current may be led into the tool by connecting the main 3 leading from the generator to a conductor braided upon the tube. If desired however the conductor may lead directly from the generator to the welding tool independently of the flexible electrode guide tube which merely comprises a piece of metallic hose. Contact between the welding conductor and electrode is made within the tool in any suitable manner. The idea of using such a flexible electrode guide tube and feeding the electrode therethrough is claimed in my application, Ser. No. 487,875, heretofore referred to. Preferably the welding tool 50 is provided with a pistol grip 51 which may be held in the hand of the operator and which may include a circuit closing device 52 for controlling the switch 22 in the welding circuit. In the arrangement shown in Fig. 21 closing of the switch 52 energizes the solenoid 53 to close the welding circuit and opening the switch 52 deenergizes the solenoid to open the switch. A relay 54 is arranged to be connected across the welding circuit when the switch 22 closes and this relay is provided with contacts 54$^a$ and 54$^b$ which normally are held open so that there is no circuit through the armature 18 or field winding 19 of the electrode feed motor. These circuits are arranged to be kept open when the welding circuit is open and also when the welding circuit is short circuited or the voltage of the welding circuit is below a predetermined value. Any suitable arrangement of relays may be provided for maintaining the motor inoperative during these conditions of the system and the relay shown in the drawing is assumed to be of the type well known as a lockout relay which remains open both when the current through the winding thereof is below a predetermined value and above a higher predetermined value.

The operation of the system shown in Fig. 21 is as follows: Assuming that the electrode 6 has been threaded through the tube the operator grasps the welding tool and touches the electrode against the work and closes the switch 52 to complete the welding circuit, and withdraws the electrode to establish the arc exactly as in hand welding as heretofore practiced. If the operator closes the switch 52 before he touches the electrode against the work the solenoid 54 maintains its contacts open by reason of the fact that the generator voltage is high at this time so that the current through the solenoid winding is so high as to lock the relay open. When the electrode is short circuited upon the work the solenoid 54 still maintains its contacts open because it is de-energized. When a short welding arc is established the solenoid 54 closes its contacts 54ª and 54ᵇ and completes the armature and field circuits of the electrode feed motor which then begins to feed the electrode through the welding tool. The rate of electrode feed is sensitively controlled to maintain the arc at constant length by the action of the regulating winding 19 as set forth in connection with the modifications heretofore described. The operator can confine his entire attention to laying down the welded metal at the place desired and is relieved of all necessity for manipulating the tool so as to maintain the arc length constant. In order to thread the welding electrode through the tube in the first instance any suitable means may be provided for closing the circuits of the electrode feed motor. In Fig. 21 I show a push button for this purpose which is provided with two contacts 55 and 56. The contact 56 is normally open and the contact 55 normally closed in the left hand position as shown in the drawing so that the connection from the main 3 to the armature 18 is normally complete. When the push button is operated to its right hand position the contact 55 connects the brush 1 of the generator to one side of the armature 18 independently of the switch 22 and the contact 56 connects the other side of the armature to one terminal of the field winding 19, so that the armature 18 and field winding 19 are connected in series across the main brushes 1 and 2 of the generator. There is no current in the welding main 3 at this time because of the fact that the contact 55 in moving over disconnects the armature 18 from the main 3.

While I have illustrated the single field winding arrangement for controlling the regulation of the electrode feed motor in the semi-automatic system shown in Fig. 21 it will be apparent that the double field winding arrangement may be used if desired.

While I have illustrated and described automatically operating relays for reversing the direction of electrode feed when the arc has been struck, it will be obvious to those skilled in the art that such automatically operating relays need not necessarily be used since if desired this reversal may be effected voluntarily by the operator when the arc has been struck. A convenient way of doing this is to provide a push button convenient to the operator for remote control of the device which effects this reversal.

While I have heretofore indicated that my invention is not in its broadest aspect limited to the particular type of welding generator described such generator is of peculiar utility in my system. In addtion to making the regulation extremely sensitive it also makes it possible greatly to simplify controlling and regulating apparatus necessary in automatic or semi-automatic arc welding systems.

It will be obvious to those skilled in the art that my invention is not limited to the particular embodiments disclosed and I therefore in the appended claims aim to cover all such modifications and variations as fall within the spirit of my invention.

What I claim as new and desire to secure by Letters Patent of the United States is:—

1. An arc welding system of the class described wherein a welding circuit is supplied from a source arranged to produce arc voltage at the terminals of the source, and wherein said arc voltage is the resultant of a plurality of electromotive forces one of which varies sensitively upon changes in the arc length during welding, and wherein electrode feeding mechanism is arranged to be operated to feed the electrode toward the work, and wherein a motor is arranged to operate said feeding mechanism, characterized by the fact that said motor is provided with a regulating field winding connected to be energized in accordance with said sensitively varying electromotive force whereby the motor will be regulated to operate said electrode feeding mechanism at the proper rate to maintain the arc length substantially constant.

2. An arc welding system of the class described wherein a welding circuit is supplied from a source arranged to produce arc voltage at the terminals of the source and wherein said arc voltage is the resultant of a plurality of electromotive forces one of which reverses when the electrode is short circuited upon the work and varies sensitively upon changes in arc length during welding, and wherein electrode feeding mechanism is arranged to be operated to feed the electrode toward and away from the work, and wherein a motor is arranged to operate said feeding mechanism, characterized by the fact that the said motor is provided with a controlling and regulating field winding connected to be energized in accordance with said electromotive force which reverses and varies, whereby the direction of operation and the speed of said motor will be controlled and regulated to operate said electrode feeding mechanism to strike the arc and thereafter feed the electrode at the proper rate to maintain the arc length substantially constant.

3. An arc welding system of the class described, wherein a welding circuit is supplied from a source arranged to produce arc voltage at the terminals of the source and wherein said arc voltage is the resultant of a plurality of electromotive forces one of which reverses when the electrode is short circuited upon the work and varies sensitively upon changes in arc length during welding, and wherein electrode feeding mechanism is arranged to be operated to feed the electrode toward and away from the work, and wherein a motor is arranged to operate said feeding mechanism, characterized by the fact that said motor is provided with two field windings one of which is continuously energized in one direction during welding and the other of which is connected to be energized in accordance with said electromotive force which reverses and varies.

4. An arc welding system of the class described wherein a welding circuit is supplied from a source arranged to produce arc voltage at the terminals of the source, and wherein said arc voltage is the resultant of a plurality of electromotive forces one of which remains substantially constant and another of which varies sensitively with changes in arc length during welding, and wherein electrode feeding mechanism is arranged to be operated to feed the electrode toward the work, and wherein a motor is arranged to operate said feeding mechanism, characterized by the fact that the motor armature is connected to be energized by said constant electromotive force and by the fact that said motor is provided with a regulating field winding connected to be energized in accordance with said sensitively varying electromotive force whereby the motor will be regulated to operate said electrode feeding mechanism at the proper rate to maintain the arc length substantially constant.

5. An arc welding system of the class described comprising in combination a welding circuit, a source of welding current adapted to deliver arc voltage to the terminals of the source, said source of welding current being constructed and arranged to produce two electromotive forces one of which remains susbtantially constant while the other reverses when the welding circuit is short circuited and varies sensitively upon changes in arc length during welding, electrode feeding mechanism arraned to be operated to feed a welding electrode toward and away from the work, a motor arranged to operate said feeding mechanism having its armature connected to be energized by said constant electromotive force, a controlling and regulating field winding for said motor connected to be energized by said electromotive force which reverses and varies whereby said motor will be operated in a direction to feed the electrode into contact with the work and automatically reversed to strike the arc and means arranged to be automatically operated when the arc is struck for again reversing the direction of electrode feed whereby the electrode is then fed toward the work and the rate of feed controlled by said regulating winding to maintain the arc at substantially constant length.

6. An arc welding system of the class described comprising a welding circuit, a generator arranged to produce arc voltage at the terminals of the generator, said generator being constructed and arranged so that the terminal voltage during welding is the resultant of two opposed electromotive forces one of which varies sensitively with changes in arc length, electrode feeding mechanism arranged to be operated to feed the electrode toward the work and a motor for operating said feeding mechanism connected to vary in speed in accordance with said sensitively varying electromotive force whereby the motor will be regulated to operate said electrode feeding mechanism at the proper rate to maintain the arc length substantially constant.

7. An arc welding system of the class described comprising a welding circuit, a generator arranged to produce arc voltage at the terminals of the generator, said generator being constructed and arranged so that the terminal voltage is the algebraic sum of two electromotive forces one of which is reversible and varies sensitively with changes in arc length during welding, electrode feeding mechanism arranged to be operated to feed the electrode toward and away from the work and a motor for operating said electrode feeding mechanism connected to vary in direction and speed of operation in accordance with the reversible and sensitively varying electromotive force whereby the motor will be controlled to operate said feeding mechanism to strike the arc and regulate the rate of electrode feed to maintain the arc length substantially constant.

8. In an arc welding system of the class described, a welding circuit, a generator having main brushes adapted to deliver arc voltage to the welding circuit and an auxiliary brush, said generator being constructed and arranged so that the electromotive force between the auxiliary brush and one main brush is substantially constant, while the electromotive force between the auxiliary brush and the other main brush varies sensitively upon changes in arc length and is opposed to said constant electromotive force whereby the arc voltage equals the difference between said constant and variable electromotive forces during welding, electrode feeding mechanism arranged to be operated to feed a welding electrode toward the work, and a motor arranged to operate said feeding mechanism having a winding connected to said main and auxiliary brushes between which the electromotive force varies, whereby the motor will be regulated to operate said electrode feeding mechanism at the proper rate to maintain the arc length substantially constant.

9. In an arc welding system of the class described, a welding circuit, a generator having main brushes adapted to deliver arc voltage to the welding circuit and an auxiliary brush, said generator being constructed and arranged so that the electromotive force between the auxiliary brush and one main brush is substantially constant while the electromotive force between the auxiliary brush and the other main brush, when the welding circuit is open, is in the same direction as said constant electromotive force and is reversed when current flows in the welding circuit and varies sensitively upon changes in arc length, whereby the electromotive force at the main brushes is the algebraic sum of the electromotive force between the auxiliary and main brushes, electrode feeding mechanism adapted to be operated to feed a welding electrode toward and away from the work, a motor arranged to operate said feeding mechanism having its armature connected to said constant electromotive force brushes and having a controlling and regulating field winding connected to said brushes between which the electromotive force varies and reverses whereby when the welding circuit is open the motor is operated in a direction to operate the electrode feeding mechanism to feed the electrode into contact with the work and then reversed to strike the arc and automatic means arranged to be operated when the arc is struck to reverse the current through the motor armature whereby the electrode is then fed toward the work and the rate of feed controlled by said regulating winding to maintain the arc at substantially constant length.

10. In an arc welding system, the combination as set forth in claim 9, together with means for producing a flux in the magnetic circuit of the electrode feed motor to assist the flux produced by the regulating winding to aid in the reversal of the feed motor to resume forward feeding of the electrode after the arc has been struck.

11. In an arc welding system, the combination as set forth in claim 9, together with a field winding on the electrode feed motor connected in series with the armature of said motor.

12. In an arc welding system of the class described, a welding circuit, a generator having main brushes adapted to supply current to the welding circuit at arc voltage and an auxiliary brush, said generator having a field structure comprising two sets of field poles, one set arranged to produce a substantially constant flux to induce a substantially constant electromotive force between said auxiliary brush and one main brush, and the other set arranged to induce an electromotive force between said auxiliary brush and the other main brush and arranged to operate below saturation and have the flux therein varied by armature reaction, an exciting winding of constant strength on said unsaturated poles arranged when the welding circuit is open to induce an electromotive force in said armature of substantially the same value and direction as said constant electromotive force, a series differential winding on said unsaturated poles to assist the armature reaction, the adjustment being such that when current is flowing in the welding circuit the flux in said unsaturated poles is reversed and sensitively varied with changes in arc length the electromotive force at the main brushes being at all times the algebraic sum of the electromotive forces between the auxiliary brush and the main brushes, electrode feeding mechanism arranged to be operated to feed a welding electrode toward the work, a motor arranged to operate said feeding mechanism having its armature connected to be energized from said constant electromotive force brushes and having a field winding connected to be energized from said variable electromotive force brushes whereby during welding the speed of the feed motor will be sensitively regulated to maintain the arc at substantially constant length.

13. In an arc welding system of the class described, a welding circuit, a generator having main brushes adapted to supply current to the welding circuit at arc voltage and an auxiliary brush, said generator having a field structure comprising two sets of field poles, one set arranged to produce a substantially constant flux to induce a substantially constant electromotive force between said auxiliary brush and one main brush, and the other set arranged to induce an electromotive force between said auxiliary brush and the other main brush and arranged to operate below saturation and have the flux therein varied by armature reaction, an exciting winding of constant strength on said unsaturated poles arranged when the welding circuit is open to induce an electromotive force in said armature of substantially the same value and direction as said constant electromotive force, a series differential winding on said unsaturated poles to assist the armature reaction, the adjustment being such that when current is flowing in the welding circuit the flux in said unsaturated poles is reversed and sensitively varied with changes in arc length the electromotive force at the main brushes being at all times the algebraic sum of the electromotive forces between the auxiliary brushes and the main brushes electrode feeding mechanism arranged to be operated to feed a welding electrode toward and away from the work, a motor arranged to operate said feeding mechanism having its armature connected to be energized from said constant electromotive force brushes, a controlling and regulating field winding for said motor connected to be energized from said brushes between which the electromotive force reverses and varies whereby said motor will be operated in a direction to feed the electrode into contact with the work and automatically reversed to strike the arc, and means arranged to be automatically operated when the arc is struck for again reversing the direction of electrode feed whereby the electrode is then fed toward the work and the rate of feed controlled by said regulating winding to maintain the arc at substantially constant length.

14. In an arc welding system of the class described, a welding circuit, a generator having main brushes adapted to supply current to the welding circuit at arc voltage and an auxiliary brush, said generator having a field structure comprising two sets of field poles, one set arranged to produce a substantially constant flux to induce a substantially constant electromotive force between said auxiliary brush and one main brush, and the other set arranged to induce an electromotive force between said auxiliary brush and the other main brush and arranged to operate below saturation and have the flux therein varied by armature reaction, an exciting winding of constant strength on said unsaturated poles arranged when the welding circuit is open to induce an electromotive force in said armature of substantially the same value and direction as said constant electromotive force, a series differential winding on said unsaturated poles to assist the armature reaction, the adjustment being such that when current is flowing in the welding circuit the flux in said unsaturated poles is reversed and sensitively varied with changes in arc length the electromotive force at the main brushes being at all times the algebraic sum of the electromotive forces between the auxiliary brush and the main brushes, electrode feeding mechanism arranged to be operated to feed a welding electrode toward and away from the work, a motor arranged to operate said feeding mechanism, a controlling and regulating field winding for said motor connected to be energized from said brushes between which the electromotive force reverses and varies, connections for energizing the armature of said motor from said constant electromotive force brushes whereby, when the welding circuit is open, said electrode feed motor is operated to feed the electrode into contact with the work and then reverse to strike the arc, and automatic means arranged to be operated when the arc is struck to reverse the connections to the armature of said feed motor again to reverse the direction of electrode feed whereby the electrode is then fed toward the work and the rate of feed controlled by said regulating winding to maintain the arc at substantially constant length.

15. In an arc welding system, the combination as set forth in claim 14, together with a field winding on the electrode feed motor connected in series with the armature of said motor to aid in the reversal of the feed motor to resume forward feeding of the electrode after the arc has been struck.

16. In an arc welding system of the class described, a welding circuit, a generator having main brushes adapted to supply current to the welding circuit at arc voltage and an auxiliary brush, said generator having a field structure comprising two sets of field poles, one set arranged to produce a substantially constant flux to induce a substantially constant electromotive force between said auxiliary brush and one main brush, and the other set arranged to induce an electromotive force between said auxiliary brush and the other main brush and arranged to operate below saturation and have the flux therein varied by armature reaction, an exciting winding of constant strength on said unsaturated poles arranged when the welding circuit is open, to induce an electromotive force in said armature of substantially the same value and direction as said constant electromotive force, a series differential winding on said unsaturated poles to assist the armature reaction, the adjustment being such that when current is flowing in the welding circuit the flux in said unsaturated poles is reversed and sensitively varied with changes in arc length the electromotive force at the main brushes being at all times the algebraic sum of the electromotive forces between the auxiliary brush and the main brushes, electrode feeding mechanism arranged to be operated to feed a welding electrode toward and away from the work, a motor arranged to operate said feeding mechanism, two field windings for said motor, one of said windings being a controlling and regulating winding connected to be energized from said brushes between which the electromotive force reverses and varies, switching means arranged in one position to open circuit the other field winding of said motor and to connect the motor armature to be energized from said constant electromotive force brushes whereby when the welding circuit is open said motor is operated to feed the electrode into contact with the work and then reversed to strike the arc, and automatic means arranged to be operated when the arc is struck to operate said switching means to reverse the armature circuit of the feed motor and connect the other field winding of the motor to be energized by said constant electromotive force and act with said controlling and regulating winding, whereby the electrode feed motor is again reversed to feed the electrode toward the work and the rate of feed regulated to maintain the arc at substantially constant length.

17. A welding system as set forth in claim 16, characterized by the further feature that the open circuit voltage of the generator is approximately twice normal arc voltage, whereby the regulating field winding of the electrode feed motor is unenergized when the arc length is normal and varies in polarity and strength upon changes in the arc length and whereby the power in the arc is at a maximum at normal arc length and substantially constant for considerable variations in arc length.

18. An arc welding system of the class described comprising a welding circuit, a generator arranged to produce arc voltage at the terminals of the generator, said generator being constructed and arranged so that the open circuit voltage is substantially twice normal arc voltage and so that the terminal voltage during welding is the resultant of two electromotive forces one of which varies in polarity and strength with changes in arc length, electrode feeding mechanism arranged to be operated to feed the electrode toward the work, and a motor for operating said feeding mechanism comprising two field windings one of which is substantially constantly energized during welding and the other of which is connected to be energized in accordance with said electromotive force which varies in polarity and strength, whereby the power in the arc is a maximum at normal arc length and the speed of the electrode feed motor regulated to maintain the arc length substantially constant.

In witness whereof, I have hereunto set my hand this 15th day of February 1922.

PAUL O. NOBLE